(12) United States Patent
Krick et al.

(10) Patent No.: US 9,431,049 B2
(45) Date of Patent: Aug. 30, 2016

(54) LOAD BALANCING AND SPACE EFFICIENT BIG DATA TAPE MANAGEMENT

(71) Applicant: International Business Machines Corporation, Armonk, NY (US)

(72) Inventors: Frank Krick, Ockenheim (DE); Thorsten Muehge, Budenheim (DE); Erik Rueger, Ockenheim (DE); Daniel Wendler, Schlangenbad (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/926,562

(22) Filed: Oct. 29, 2015

(65) Prior Publication Data

US 2016/0049171 A1  Feb. 18, 2016

Related U.S. Application Data

(63) Continuation of application No. 14/726,946, filed on Jun. 1, 2015, now Pat. No. 9,202,485, and a continuation of application No. 14/277,515, filed on May 14, 2014, now Pat. No. 9,093,088.

(51) Int. Cl.
| | | |
|---|---|---|
| *G11B 15/68* | (2006.01) | |
| *G11B 5/39* | (2006.01) | |
| *G11B 17/22* | (2006.01) | |
| *B65G 1/06* | (2006.01) | |
| *B65G 1/137* | (2006.01) | |

(52) U.S. Cl.
CPC ............. *G11B 15/6895* (2013.01); *B65G 1/06* (2013.01); *B65G 1/1371* (2013.01); *G11B 5/39* (2013.01); *G11B 15/6815* (2013.01); *G11B 15/6835* (2013.01); *G11B 17/221* (2013.01); *G11B 17/225* (2013.01)

(58) Field of Classification Search
CPC ............ G11B 15/6835; G11B 17/225; G11B 15/689; G11B 15/68; G11B 15/6885; G11B 15/6815; G11B 15/6825
USPC ...................................................... 360/92.1
See application file for complete search history.

(56) References Cited

U.S. PATENT DOCUMENTS

| | | | | |
|---|---|---|---|---|
| 5,537,268 | A * | 7/1996 | Felde | G11B 17/225 360/92.1 |
| 6,438,623 | B1 | 8/2002 | Ryan | |
| 6,504,671 | B2 * | 1/2003 | Iwabuchi | G11B 15/6835 360/92.1 |
| 6,985,328 | B2 * | 1/2006 | Vanderheyden | G11B 15/6835 360/92.1 |
| 7,009,798 | B1 | 3/2006 | Gupta et al. | |

(Continued)

FOREIGN PATENT DOCUMENTS

EP          1205927 B1    1/2006

OTHER PUBLICATIONS

U.S. Appl. No. 14/277,515, filed May 14, 2014.

(Continued)

*Primary Examiner* — Mark Blouin
(74) *Attorney, Agent, or Firm* — Maeve Carpenter

(57) ABSTRACT

A tool for space efficient tape management. The tool retrieves one or more tapes from one or more tape library frames in a first tape library. The tool inserts the one or more tapes into the one or more tape library frames in the first tape library. The tool transfers the one or more tapes from the one or more tape library frames in the first tape library to one or more tape library frames in a second tape library.

17 Claims, 7 Drawing Sheets

(56) References Cited

U.S. PATENT DOCUMENTS

| | | |
|---|---|---|
| 7,199,967 B2 | 4/2007 | Benson et al. |
| 7,480,111 B2 * | 1/2009 | Ikeuchi .............. G11B 15/6815 360/69 |
| 7,672,754 B1 | 3/2010 | Haustein et al. |
| 8,139,314 B2 | 3/2012 | Green et al. |
| 8,213,108 B2 * | 7/2012 | Noguchi ............ G11B 15/6815 360/92.1 |
| 8,320,071 B2 | 11/2012 | Fok et al. |
| 8,457,778 B2 | 6/2013 | Starr et al. |
| 2013/0003222 A1 | 1/2013 | Wideman |

OTHER PUBLICATIONS

U.S. Appl. No. 14/726,946, filed Jun. 1, 2015.
List of IBM Patents or Patent Applications Treated as Related (Appendix P), filed herewith.

* cited by examiner

LOAD BALANCING AND SPACE EFFICIENT BIG DATA TAPE MANAGEMENT

BACKGROUND OF THE INVENTION

The present invention relates generally to big data tape management, and more particularly to a tape library frame for space-saving and load-balancing in a tape library cluster.

In big data tape management systems, data is digitally stored on a magnetic tape media (i.e., tapes). Reading and writing of the information stored on the tapes is executed by a tape drive. Tape drives are arranged in a column within a tape library. Tape libraries are divided into a plurality of frames, and tapes are stored within the plurality of frames in the tape library. Tapes are stored within the plurality of frames in the tape library separately from the tape drives. An alignment system selects a tape and transfers it to a vacant tape drive via an x-y-z rail system (i.e., a mechanical armature capable of moving horizontally on an x-axis, vertically on a y-axis, and diagonally on a z-axis). A plurality of tape libraries can be interconnected and organized spatially in columns and rows.

Typically, tape enterprise technology combines sixteen frames per one library. Sixteen tape libraries can be linked together with each other in a library cluster. A top unit can be used to move tapes between different library enclosures (i.e., a library interconnect). Library interconnects are used to leverage the workload between one or more libraries.

Presently, state of the art technology can store a maximum of 8.5 terabytes of uncompressed data on a single tape. Global digital data requires approximately $3.5 \times 10^9$ tapes to store the information. Future estimates suggest that the world wide stored data will consume the equivalent of 1000 fully equipped tape enterprise libraries. Translated into floor space, 1000 fully equipped tape enterprise libraries would produce a library footprint equivalent to three soccer fields.

The growth rate for digitally stored data is approximately $2^{n/2}$, with n equal to the number of years. This means tape enterprise libraries capable of handling the growth in digitally stored data in ten years would produce a library footprint equivalent to 96 soccer fields.

SUMMARY

Embodiments of the present invention provide a method, computer program product, and system for tape management. The method includes retrieving one or more tapes from one or more tape library frames in a first tape library. The method includes inserting the one or more tapes into the one or more tape library frames in the first tape library. The method includes transferring the one or more tapes from the one or more tape library frames in the first tape library to one or more tape library frames in a second tape library.

DETAILED DESCRIPTION

Figure 1:
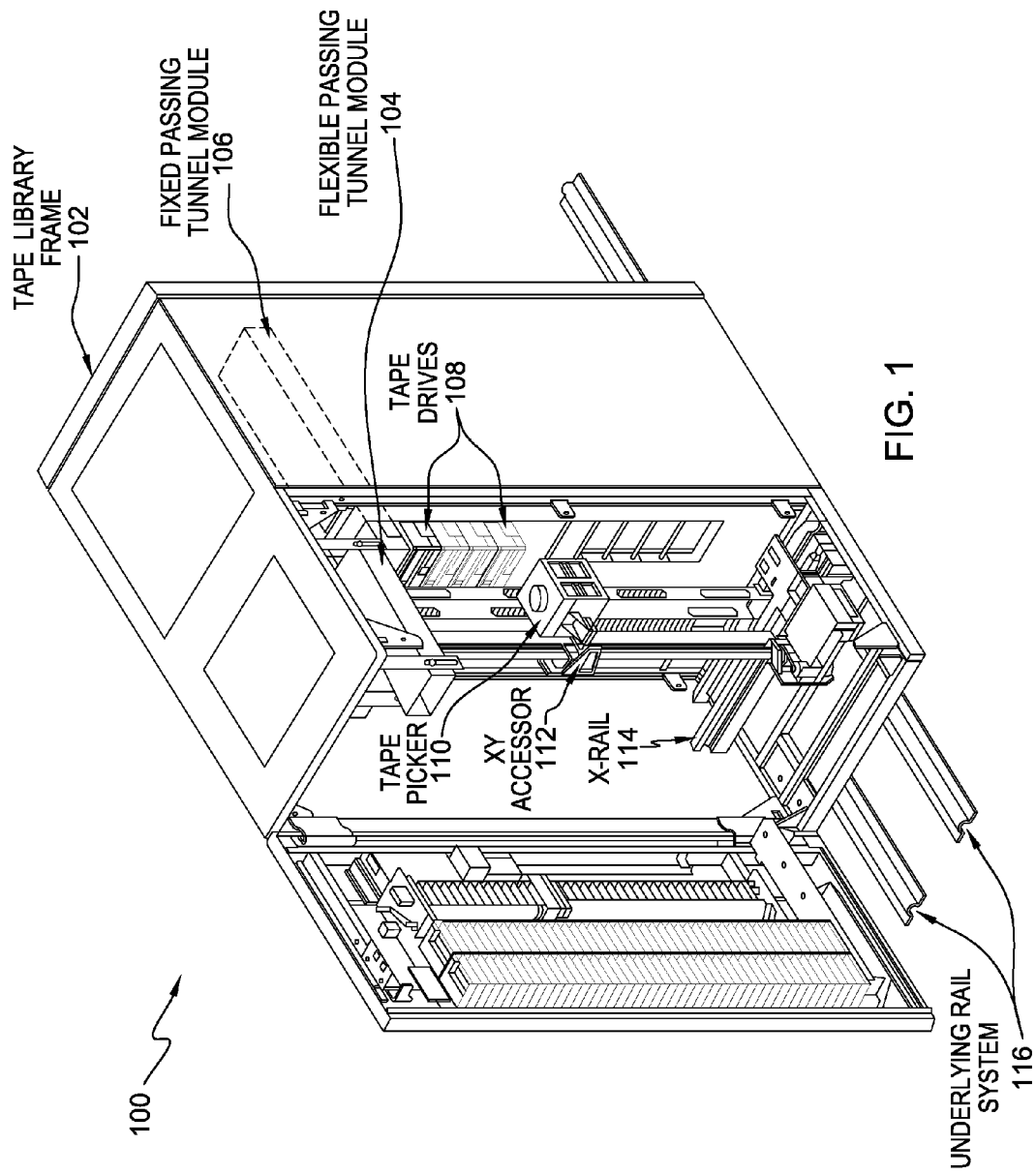
FIG. 1 illustrates a big data tape management environment, generally designated 100, in accordance with an embodiment of the present invention.

Embodiments of the present invention recognize that future big data growth will impact big data tape management environments.

Embodiments of the present invention provide a tape library frame for a space-saving, load-balancing library cluster including a tape passing module for passing a tape from one tape library to another. Embodiments of the present invention provide a space efficient management system including a movement system for moving each single tape library into a close position relative to other tape libraries in the library cluster in order to minimize the footprint of the library cluster, pass one or more tapes from one tape library frame to another, and allow for a flexible power and network connectivity system.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to Figures. FIG. 1 illustrates a portion of a big data tape management environment, generally designated 100, including a tape library frame 102 for space-saving and load-balancing within big data tape management environment 100. In the exemplary embodiment, a plurality of tape library frames, such as tape library frame 102, can be interconnected to form one or more tape libraries. The one or more tape libraries can be organized into a plurality of columns evenly spaced within a floor space (i.e., within a designated space within, for example, a building, a warehouse, etc.). In another embodiment, one or more tape libraries may be stacked atop the one or more tape libraries organized into the plurality of columns to satisfy demands imposed by future growth of big data management, within existing floor space, by effectively building up, as opposed to building out. In the exemplary embodiment, tape library frame 102 includes one or more components, including, but not limited to, a flexible passing tunnel module (FPTMa) 104, a fixed passing tunnel module (FPTMb) 106, one or more tape drives 108, a tape picker 110, an XY accessor 112, an X-rail 114, and an underlying rail system 116.

In the exemplary embodiment, FPTMa 104 is an enclosed tunnel module for passing one or more tapes between one or more tape library frames, such as tape library frame 102. FPTMa 104 is positioned on the front side of tape library frame 102 to receive one or more tapes from the back side of an interconnected tape library frame. In the exemplary embodiment, FPTMa 104 is located in a vacant tape drive slot (not shown) within tape library frame 102 above one or more tape drive slots occupied by one or more tape drives 108. In the exemplary embodiment, FPTMa 104 is capable of moving up and down within tape library frame 102 to enable tape picker 110 to place one or more tapes into FPTMb 106. FPTMa 104 is discussed in further detail in subsequent Figures.

In the exemplary embodiment, FPTMb 106 is an enclosed tunnel module for passing one or more tapes between one or more tape library frames, such as tape library frame 102. FPTMb 106 is positioned at the back side of tape library frame 102 to transport one or more tapes to the front side of an interconnected tape library frame. In the exemplary embodiment, FPTMb 106 is located in a vacant tape drive slot (not shown) within tape library frame 102 above one or more tape drive slots occupied by one or more tape drives 108. FPTMb 106 is discussed in further detail in subsequent Figures.

In the exemplary embodiment, tape drives 108 are data storage devices for executing read and write information on one or more magnetic tapes (i.e., tapes). In the exemplary embodiment, tape drives 108 are arranged in a column within tape library frame 102. In the exemplary embodiment, tape drives 108 and the one or more tapes are stored separately within the tape library (i.e., tapes are stored separately from tape drives 108, in one or more tape library frames dedicated for tape storage).

In the exemplary embodiment, tape picker 110 is an assembly within tape library frame 102 for retrieving the one or more tapes from a plurality of tape storage slots within a tape library (i.e., within one or more interconnected tape library frames dedicated for tape storage), and transporting the one or more tapes to tape drives 108 for read and write execution, or FPTMb 106 for transport to an interconnected tape library frame, such as a tape library frame similar to tape library frame 102.

In the exemplary embodiment, XY accessor 112 is an assembly for manipulating tape picker 110 within tape library frame 102 and a plurality of interconnected tape library frames. In the exemplary embodiment, XY accessor 112 is capable of moving tape picker 110 up and down on an X-axis, left and right on a Y-axis, and diagonally on a Z-axis. XY accessor 112 includes an electronic motor (not shown), or any other suitable mechanism facilitating movement of the assembly within the tape library. For example, XY accessor 112 enables tape picker 110 within tape library frame 102 to move left through one or more interconnected tape library frames until tape picker 110 reaches its destination tape library frame. Within that tape library frame, XY accessor 112 enables tape picker 110 to move up a column of stored tapes to retrieve a tape from a plurality of tape storage slots within that tape library frame. Once a tape is retrieved, XY accessor 112 enables tape picker 110 to move back to tape library frame 102 with the retrieved tape and insert the tape into one or more tape drives 108 for executing read and write information.

In the exemplary embodiment, X-rail 114 is a rail assembly enabling XY accessor 112 to move left and right within a tape library. XY accessor 112 is attached to X-rail 114 by a wheel-on-rail assembly, or any other suitable mechanism for attaching an assembly to a rail to facilitate movement along an X-axis.

In the exemplary embodiment, underlying rail system 116 is a rail system for moving tape library frame 102, a plurality of interconnected tape library frames, or a tape library, within defined floor space in a big data tape management environment. Underlying rail system 116 is discussed in further detail in subsequent Figures.

Figure 2:
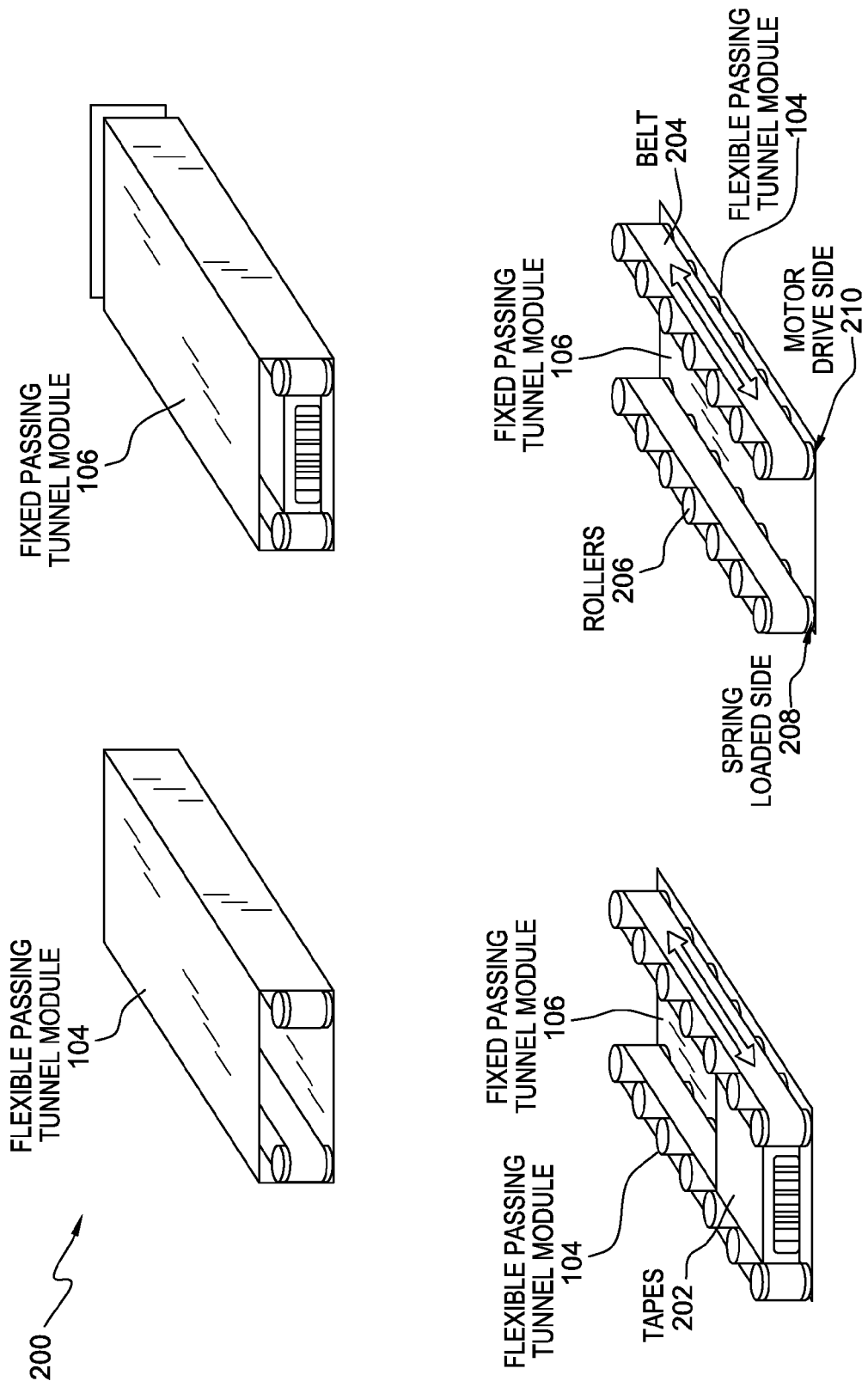
FIG. 2 is a configuration diagram, generally designated 200, for a fixed passing tunnel module and a flexible passing tunnel module, such as FPTMa 104 and FPTMb 106, respectively, in accordance with an exemplary embodiment of the present invention.

FIG. 2 is a configuration diagram, generally designated 200, for a fixed passing tunnel module and a flexible passing tunnel module, such as FPTMa 104 and FPTMb 106, respectively, in accordance with an exemplary embodiment of the present invention.

In the exemplary embodiment, tapes 202 are magnetic cartridges for storing read and write information. FPTMa 104 and FPTMb 106 are mechanisms configured to receive and transport tapes 202 within a tape library frame, such as tape library frame 102. In the exemplary embodiment, FPTMa 104 and FPTMb 106 are characterized by having a spring loaded side 208 and a motor drive side 210 for moving tapes 202 forward and backward. Spring loaded side 208 includes one or more rollers 206, which are spring loaded, free-spinning, and not driven by any motor, and belt 204. Spring loaded side 208 provide spring-assisted pressure to tapes 202 via rollers 206 and belt 204 to enable FPTMa 104 and FPTMb 106, in conjunction with motor drive side 210, to move tapes 202 forward and backward, as well as eject or pass tapes 202 to one or more interconnected tape library frames. Motor drive side 210 includes one or more rollers 206, which are driven by an electric motor, or any other suitable mechanism for actuating rollers 206 simultaneously in a forward or backward direction. Rollers 206 on motor drive side 210 are fixed position rollers having a belt 204. Belt 204 is a circulating closed flat rubber belt for contacting both tapes 202 and rollers 206 simultaneously within FPTMa 104 and FPTMb 106. For example, the integrated transportation mechanism of FPTMa 104 and FPTMb 106 operates similarly to a conveyor belt, such that spring loaded side 208 provides spring-assisted pressure to tapes 202 sufficient to contact tapes 202 with motor drive side 210 to contact belt 204 moving around a plurality of rollers 206 driven by an electronic motor.

In another embodiment, additional rollers 206 may be placed in the bottom of both FPTMa 104 and FPTMb 106 to provide ease of movement for tapes 202 through FPTMa 104 and FPTMb 106.

Figure 3:
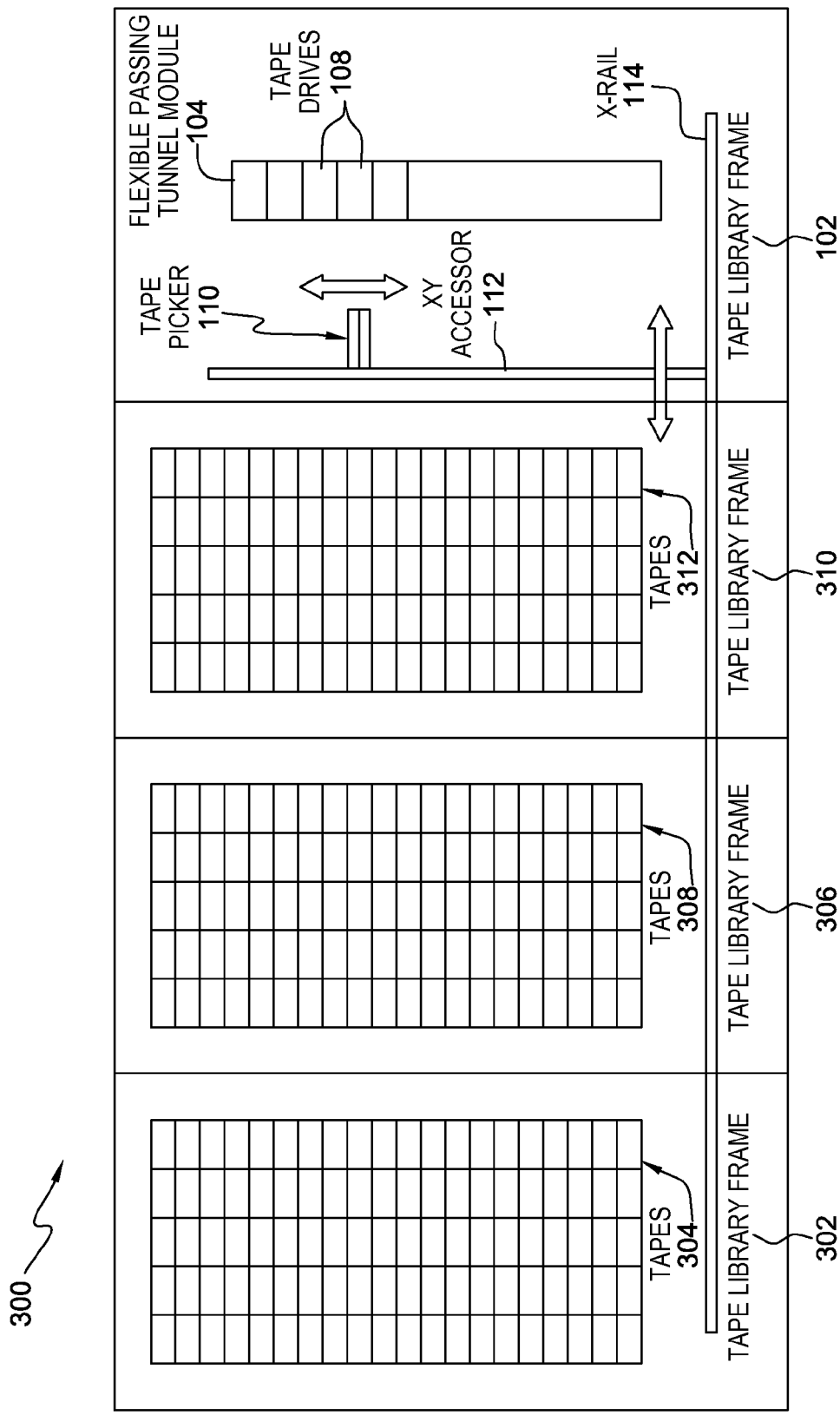
FIG. 3 is a configuration diagram of a tape library, generally designated 300, including a plurality of tape library frames, in accordance with an embodiment of the present invention.

FIG. 3 is a configuration diagram of a tape library, generally designated 300, including a plurality of tape library frames, in accordance with an embodiment of the present invention.

In the exemplary embodiment, tape library 300 includes one or more tape library frames, such as tape library frame 102 and tape library frame 302, tape library frame 306, and tape library frame 310. Tape library frame 102 includes one or more components, including, but not limited to, a flexible passing tunnel module (FPTMa) 104, one or more tape drives 108, a tape picker 110, an XY accessor 112, and an X-rail 114. Tape library frame 302, 306, and 310 each include one or more tapes, such as tapes 304, 308, and 312, respectively. In the exemplary embodiment, tape library frame 102 is interconnected with tape library frame 310, 306, and 302.

In the exemplary embodiment, FPTMa 104 can be located in the most right tape library frame in the tape library, such as tape library frame 102, and in the most left tape library frame in the tape library, such as tape library frame 302. The location of FPTMa 104 and FPTMb 106 (not shown) is limited to the most left tape library frame and the most right tape library frame due to the movement of XY accessor 112 left and right on X-rail 114 (i.e., mechanical barrier created by movement on an X-axis). Positioning FPTMa 104 and FPTMb 106 in the most left and most right tape library frame maximizes access to a plurality of tapes within tapes 304, 308, and 312 achievable by tape picker 110. For example, XY accessor 112 can move left through tape library frame 310, 306, and 302 to enable tape picker 110 to retrieve one or more tapes from tapes 312, 308, and 304, respectively, and transport the one or more tapes to tape drives 108 or to an interconnected tape library frame through FPTMb 106.

Figure 4:
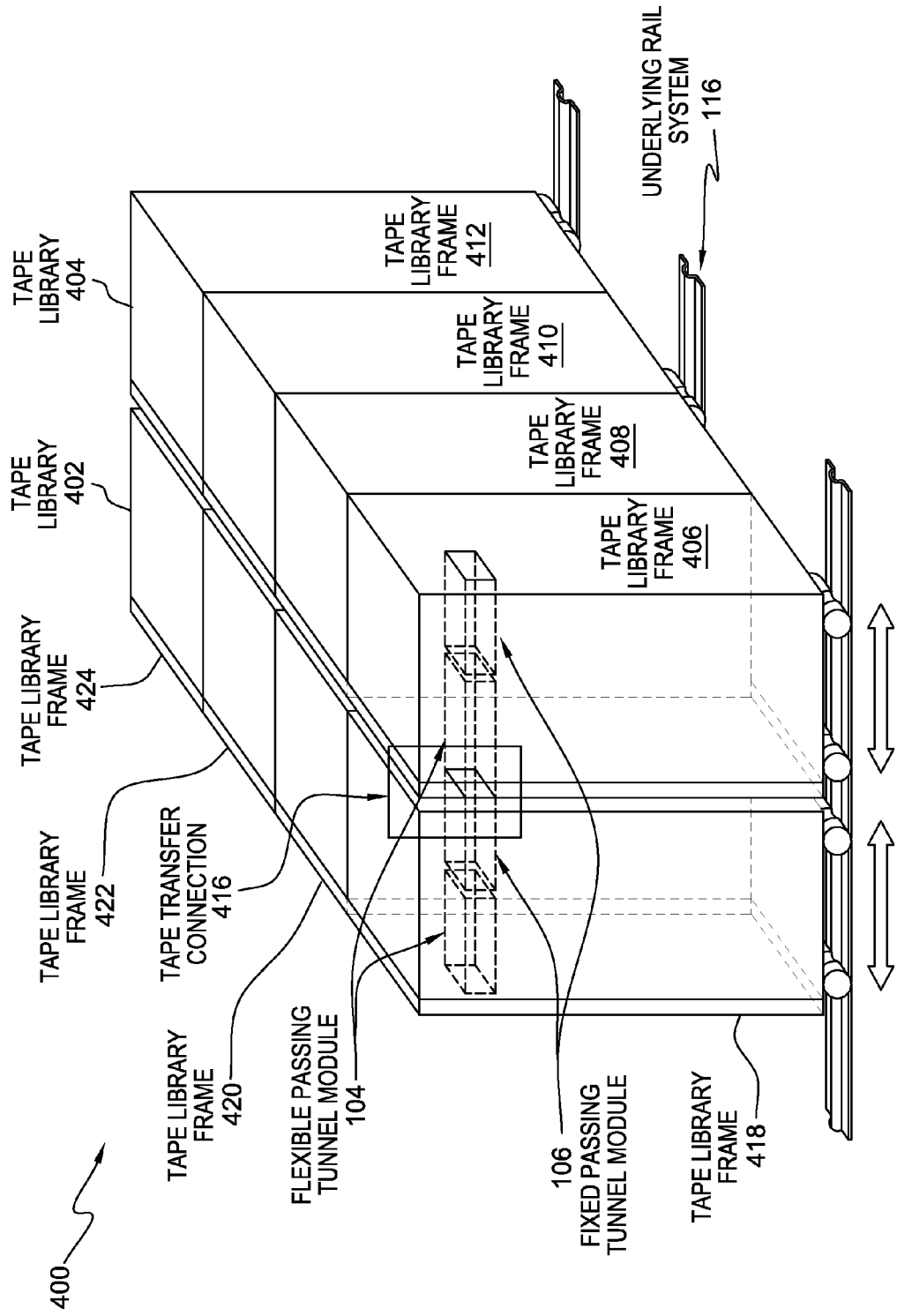
FIG. 4 is a configuration diagram, generally designated 400, illustrating a plurality of tape library frames interconnected in a space efficient library management system, in accordance with an embodiment of the present invention.

FIG. 4 is a configuration diagram, generally designated 400, illustrating a plurality of tape library frames interconnected in a space efficient library management system, in accordance with an embodiment of the present invention. In the exemplary embodiment, tape library 402 and tape library 404 are tape libraries including a plurality of tape library frames, such as tape library frame 406, 408, 410, 412, 418, 420, 422, and 424. In the exemplary embodiment, tape library frame 406 of tape library 404 and tape library frame 418 of tape library 402 each include a flexible passing tunnel module, such as FPTMa 104, and a fixed passing tunnel module, such as FPTMb 106, respectively.

In the exemplary embodiment, a tape transfer connection 416 is established between tape library frame 406 and tape library frame 418 when the tape library frame 406 of tape library 404 is moved into a closed, non-maintenance position with tape library frame 418 of tape library 402. Tape transfer connection 416 is a mechanical connection for transfer of tapes between tape library 404 and 402 through FPTMa 104 and FPTMb 106 of tape library frame 406 and tape library frame 418, respectively.

In the exemplary embodiment, tape library 402 and tape library 404 can be moved in a forward and backward direction parallel to FPTMa 104 and FPTMb 106, moving tape library 402 and tape library 404 into a plurality of configurations via underlying rail system 116. Underlying rail system 116 is discussed in further detail in subsequent Figures.

Figure 5:
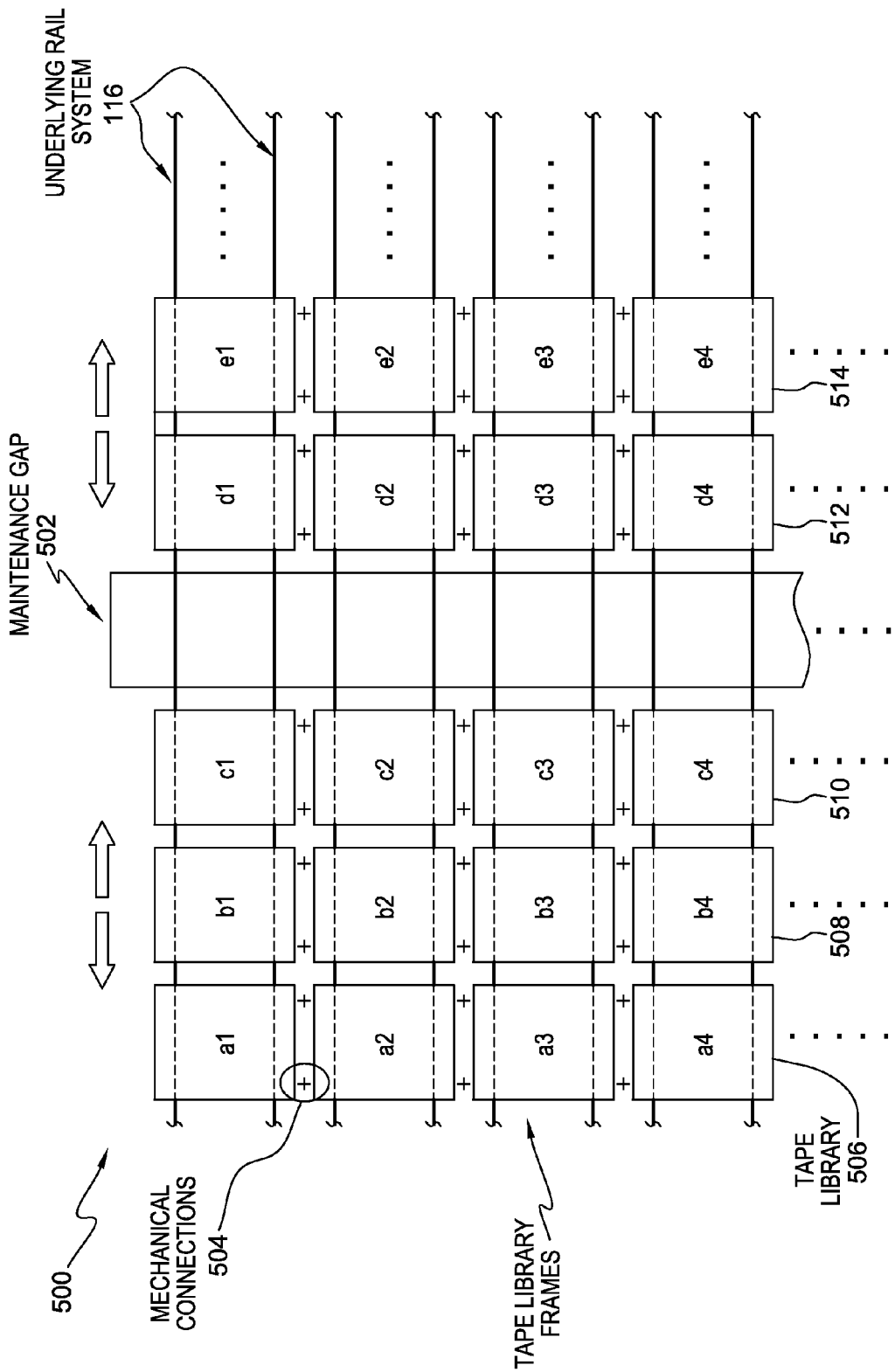
FIG. 5 is a configuration diagram, generally designated 500, illustrating a configuration of a plurality of tape libraries in a space efficient library management system, in accordance with an embodiment of the present invention.

FIG. 5 is a configuration diagram, generally designated 500, illustrating a configuration of a plurality of tape libraries in a space efficient library management system, in accordance with an embodiment of the present invention. In the exemplary embodiment, the plurality of tape libraries, including, but not limited to a tape library 506, 508, 510, 512, and 514, are arranged in a plurality of columns and rows. Tape library 506, 508, and 510 are in a closed, non-maintenance position relative to one another. Similarly, tape library 512 and 514 are in a closed, non-maintenance position relative to one another. In the exemplary embodiment, tape library 510 and 512 are in an open, maintenance position relative to one another. A maintenance gap 502 is the gap of open floor space created between tape library 510 and 512 when they are moved into an open, maintenance position. Maintenance gap 502 provides service (i.e., troubleshooting, repair, maintenance, etc.) related access to a plurality of tape library frames included within a tape library, such as tape library 512. In the exemplary embodiment, maintenance gap 502 can be created between any two tape libraries in a plurality of tape libraries by moving the plurality of tape libraries left and right on underlying rail system 116. In the exemplary embodiment, moving tape libraries, such as tape library 506 and tape library 508 into a closed, non-maintenance position allows FPTMa 104 and FPTMb 106 to establish a mechanical connection for transfer of tapes between tape libraries. In the exemplary embodiment, a plurality of tape libraries can be moved into a closed, non-maintenance position with one another to establish a plurality of mechanical connections, such as mechanical connections 504. Underlying rail system 116 is discussed in further detail in subsequent Figures.

In the exemplary embodiment, the one or more tape library frames of the one or more tape libraries, such as tape library 506, 508, 510, 512, and 514 are interconnected by a plurality of mount points. In the exemplary embodiment, the plurality of mount points fix the one or more tape library frames together to form an interconnected column of tape library frames that, together, make up the one or more tape libraries.

Figure 6:
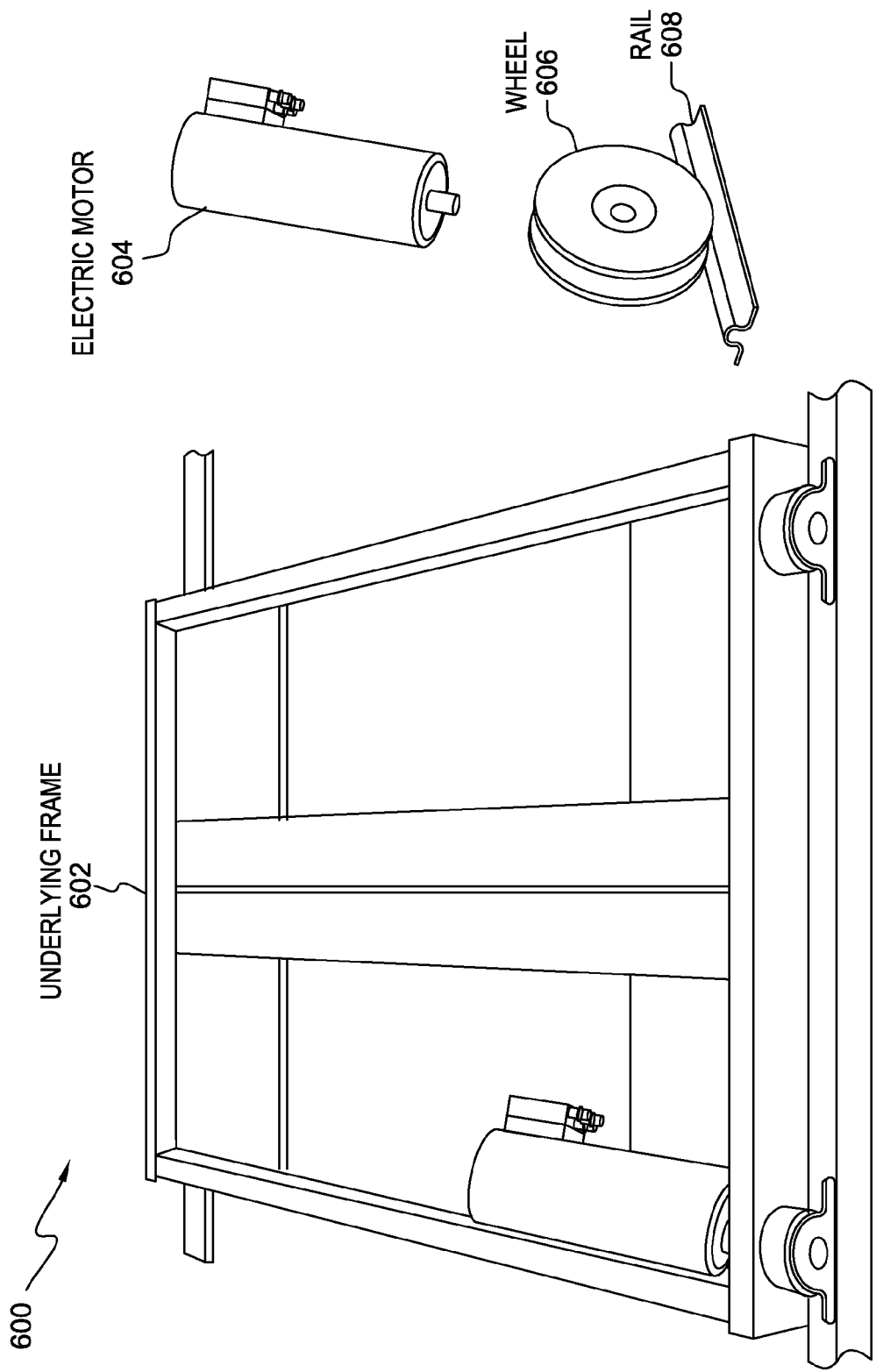
FIG. 6 is a configuration diagram, generally designated 600, illustrating components of an underlying rail system for moving one or more tape libraries in a space efficient library management system, in accordance with an embodiment of the present invention.

FIG. 6 is a configuration diagram, generally designated 600, illustrating components of an underlying rail system for moving one or more tape libraries in a space efficient library management system, in accordance with an embodiment of the present invention. In the exemplary embodiment, an underlying rail system, such as underlying rail system 116, includes an underlying frame 602, an electric motor 604, a wheel 606, and a rail 608. In the exemplary embodiment, a tape library frame, such as tape library frame 102, can be placed within underlying frame 602 to enable movement of the tape library frame on one or more rails, such as rail 608. Underlying frame 602 has one or more wheels, such as wheel 606, attached at each corner.

In the exemplary embodiment, rail 608 mates to wheel 606, enabling the forward and backward movement of underlying frame 602 on one or more rails, such as rail 608. In the exemplary embodiment, electric motor 604 is an electronic motor capable of powering one or more wheels, such as wheel 606, to drive the one or more wheels, enabling forward and backward movement of underlying frame 602 on one or more rails, such as rail 608. In the exemplary embodiment, electric motor 604 can be attached to underlying frame 602 and one or more wheels, such as wheel 606. In another embodiment, electric motor 604 may be fitted inside of a tape library frame, such as tape library frame 102, and mated to one or more wheels attached to underlying frame 602. In another embodiment, electric motor 604 may be any suitable motor or driving device capable of powering a wheel, such as wheel 606, to enable forward and backward movement along a rail, such as rail 608.

Figure 7:
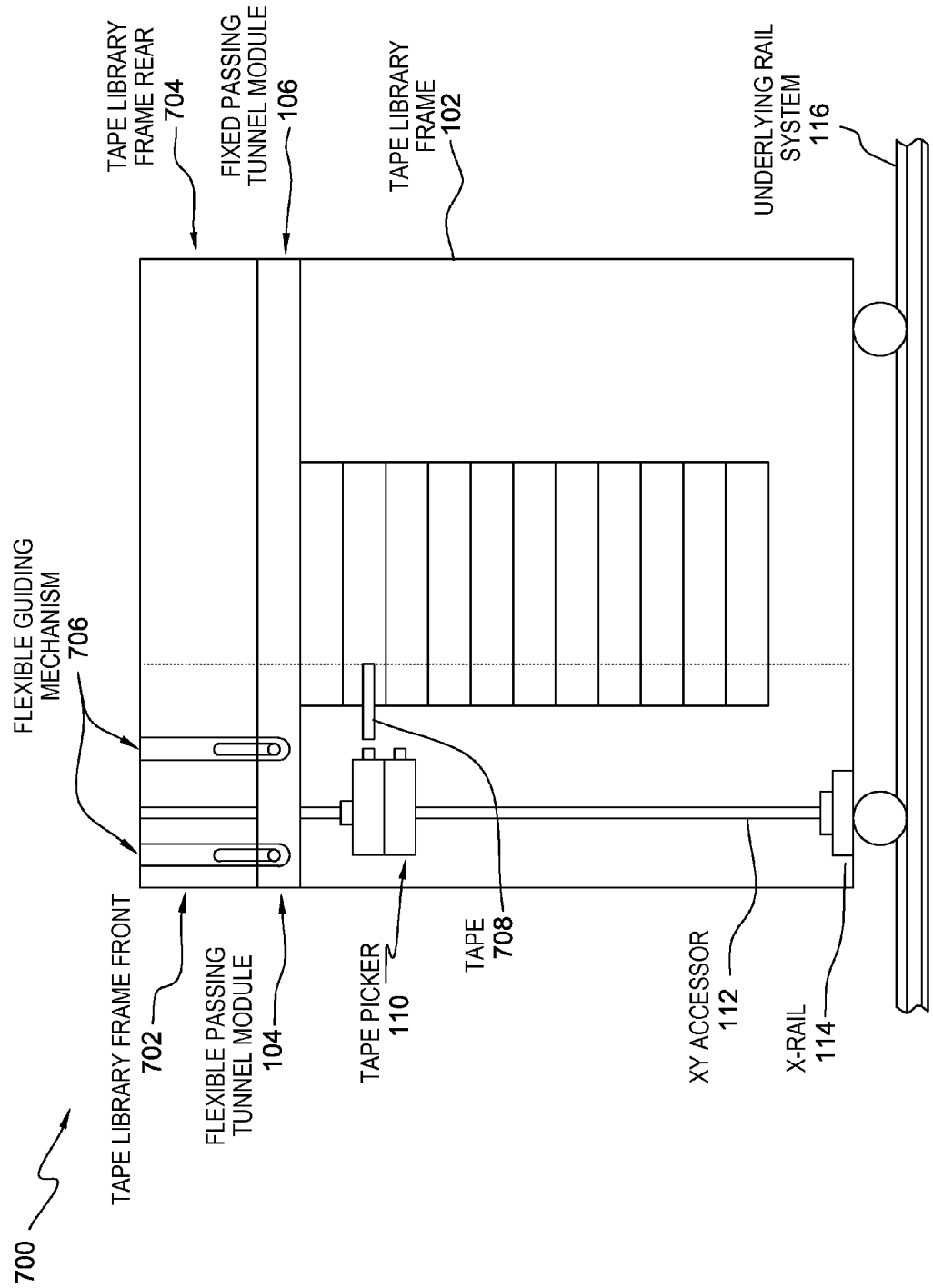
FIG. 7 is a configuration diagram, generally designated 700, for illustrating a process for transferring a tape from a first tape library frame, such as tape library frame 102, to a second tape library frame, in accordance with an embodiment of the present invention.

FIG. 7 is a configuration diagram, generally designated 700, for illustrating a process for transferring a tape from a first tape library frame, such as tape library frame 102, to a second tape library frame, in accordance with an embodiment of the present invention. In the exemplary embodiment, a tape library frame, such as tape library frame 102 is shown to illustrate a process for transferring a tape, such as tape 708, from a first tape library frame, such as tape library frame 102, to a second tape library frame (not shown).

The process begins with tape picker 110 retrieving tape 708 from a tape drive (not shown). In the exemplary embodiment, tape 708, a magnetic tape for storing read and write information, is loaded into a tape drive. Tape picker 110 retrieves tape 708 from the tape drive by attaching to tape 708, causing release of tape 708 from the tape drive, and drawing tape 708 into a slot within tape picker 110 for transport. In another embodiment, tape picker 110 may retrieve tape 708 from a tape slot (not shown) by moving left along X-rail 114 until it reaches the tape slot containing tape 708. Tape picker 110 retrieves tape 708 from the tape slot by attaching to tape 708, causing release of tape 708 from the tape slot, and drawing tape 708 into a slot within tape picker 110 for transport. Tape picker 110 moves right along X-rail 114 until it reaches a position in tape library frame 102 in line with flexible passing tunnel module 104.

Next, tape picker 110 moves up along XY accessor 112, contacting the bottom side of flexible passing tunnel module (FPTMa) 104, thereby raising up FPTMa 104 along a flexible guiding mechanism 706, exposing an opening in fixed passing tunnel module (FPTMb) 106.

Next, tape picker 110 inserts tape 708 into the opening in FPTMb 106. In the exemplary embodiment, FPTMb 106 includes a sensor (not shown) that notices when a tape, such as tape 708, is positioned to be inserted into FPTMb 106. Tape picker 110 inserts tape 708 into FPTMb 106 in a similar fashion to loading a tape into a tape drive, such as tape drives 108.

In response to tape picker 110 inserting tape 708 into FPTMb 106, tape picker 110 moves down along XY accessor 112, simultaneously lowering FPTMa 104 along flexible guiding mechanism 706 until FPTMa 104 reaches the bottom of flexible guiding mechanism 706, lining up with the opening of FPTMb 106. In the exemplary embodiment, when FPTMa 104 is in line with FPTMb 106, the opening previously exposed in FPTMb 106 is closed, thereby creating a continuous passing tunnel module, and tape 708 is successfully loaded into FPTMb 106. Once successfully loaded, tape 708 is ready for transfer to the second tape library frame, oriented in a closed, non-maintenance position to the first tape library frame, through a mechanical tape transfer connection.

Finally, FPTMb 106 transports tape 708 to the second tape library frame by moving tape 708 from tape library frame front 702 to tape library frame rear 704, where tape 708 will exit the first tape library frame, and enter the second tape library frame, through a mechanical tape transfer connection established by the closed, non-maintenance position shared between the first tape library frame and the second tape library frame. In the exemplary embodiment, the closed, non-maintenance position shared between the first tape library frame and the second tape library frame is established by the first tape library frame and the second tape library frame moving forwards and backwards along underlying rail system 116.

In the exemplary embodiment, the process for transferring a tape from a first tape library frame to a second tape library frame is powered by a flexible library power and network connectivity system (not shown). In the exemplary embodiment, the flexible library power and network connectivity system allows the movement of a plurality of tape library frames, such as tape library frame 102, within a space efficient library management system, and allows for transferring one or more tapes, such as tape 708, between the plurality of tape library frames within the space efficient library management system. In the exemplary embodiment, the flexible library power and network connectivity system can be a cable roll system. In another embodiment, where the structure housing the space efficient library management system permits, a long cable connection may descend from the top of a ceiling, eliminating the cable roll system.

What is claimed is:

1. A method for space efficient tape management, the method comprising:
    retrieving one or more tapes from one or more tape library frames in a first tape library;
    inserting the one or more tapes into the one or more tape library frames in the first tape library;
    wherein inserting the one or more tapes into the one or more tape library frames in the first tape library includes inserting the one or more tapes into a fixed passing tunnel portion of a passing tunnel module in the one or more tape library frames in the first tape library; and
    transferring the one or more tapes from the one or more tape library frames in the first tape library to one or more tape library frames in a second tape library.

2. The method of claim 1 further comprises:
    moving the first tape library and the second tape library into a closed, non-maintenance position.

3. The method of claim 2, wherein moving the first tape library and the second tape library into a closed, non-maintenance position, further comprises:
    moving the first tape library and the second tape library in a forward and backward motion along an underlying rail system, wherein the non-maintenance position establishes a mechanical connection for transfer of the one or more tapes between the first tape library and the second tape library.

4. The method of claim 1, wherein transferring the one or more tapes from the one or more tape library frames in the first tape library to one or more tape library frames in a second tape library, further comprises:
    transferring the one or more tapes from a fixed passing tunnel portion of a passing tunnel module in the one or more tape library frames in the first tape library to a flexible passing tunnel module of a passing tunnel module in one or more tape library frames in the second tape library.

5. The method of claim 4, wherein transferring the one or more tapes from a fixed passing tunnel portion of a passing tunnel module in the one or more tape library frames in the first tape library to a flexible passing tunnel module of a passing tunnel module in one or more tape library frames in the second tape library, further comprises:
    moving the one or more tapes through a mechanical transfer connection between the first tape library and the second tape library in a closed, non-maintenance position.

6. The method of claim 5, wherein moving the one or more tapes through the mechanical transfer connection between the first tape library and the second tape library in the closed, non-maintenance position, further comprises:
    activating a motor-driven side of each of a fixed passing tunnel portion of the passing tunnel module in the one or more tape library frames in the first tape library and a flexible passing tunnel portion of the passing tunnel module in the one or more tape library frames in the second tape library.

7. A computer program product for space efficient tape management, the computer program product comprising:
    one or more computer-readable storage devices and program instructions stored on the one or more computer-readable storage devices, the program instructions comprising:
    program instructions to retrieve one or more tapes from one or more tape library frames in a first tape library;
    program instructions to insert the one or more tapes into the one or more tape library frames in the first tape library;
    wherein program instructions to insert the one or more tapes into the one or more tape library frames in the first tape library include program instructions to insert the one or more tapes into a fixed passing tunnel portion of a passing tunnel module in the one or more tape library frames in the first tape library; and
    program instructions to transfer the one or more tapes from the one or more tape library frames in the first tape library to one or more tape library frames in a second tape library.

8. The computer program product of claim 7 further comprises:
    program instructions to move the first tape library and the second tape library into a closed, non-maintenance position.

9. The computer program product of claim 8, wherein program instructions to move the first tape library and the second tape library into a closed, non-maintenance position, further comprises:
    program instructions to move the first tape library and the second tape library in a forward and backward motion along an underlying rail system, wherein the non-maintenance position establishes a mechanical connection for transfer of the one or more tapes between the first tape library and the second tape library.

10. The computer program product of claim 7, wherein program instructions to transfer the one or more tapes from the one or more tape library frames in the first tape library to one or more tape library frames in a second tape library, further comprises:
    program instructions to transfer the one or more tapes from a fixed passing tunnel portion of a passing tunnel module in the one or more tape library frames in the first tape library to a flexible passing tunnel module of a passing tunnel module in one or more tape library frames in the second tape library.

11. The computer program product of claim 10, wherein program instructions to transfer the one or more tapes from a fixed passing tunnel portion of a passing tunnel module in the one or more tape library frames in the first tape library to a flexible passing tunnel module of a passing tunnel module in one or more tape library frames in the second tape library, further comprises:
    program instructions to move the one or more tapes through a mechanical transfer connection between the first tape library and the second tape library in a closed, non-maintenance position.

12. The computer program product of claim 11, wherein program instructions to move the one or more tapes through the mechanical transfer connection between the first tape library and the second tape library in the closed, non-maintenance position, further comprises:
    program instructions to activate a motor-driven side of each of a fixed passing tunnel portion of the passing tunnel module in the one or more tape library frames in the first tape library and a flexible passing tunnel portion of the passing tunnel module in the one or more tape library frames in the second tape library.

13. A computer system for space efficient tape management, the system comprising:
    one or more computer processors;
    one or more computer readable storage devices;
    program instructions stored on at least one of the one or more computer readable storage devices for execution by at least one of the one or more computer processors, the program instructions comprising:
    program instructions to retrieve one or more tapes from one or more tape library frames in a first tape library;
    program instructions to insert the one or more tapes into the one or more tape library frames in the first tape library;
    wherein program instructions to insert the one or more tapes into the one or more tape library frames in the first tape library include program instructions to insert the one or more tapes into a fixed passing tunnel portion of a passing tunnel module in the one or more tape library frames in the first tape library; and
    program instructions to transfer the one or more tapes from the one or more tape library frames in the first tape library to one or more tape library frames in a second tape library.

14. The computer system of claim 13 further comprises:
    program instructions to move the first tape library and the second tape library into a closed, non-maintenance position.

15. The computer system of claim 14, wherein program instructions to move the first tape library and the second tape library into a closed, non-maintenance position, further comprises:
    program instructions to move the first tape library and the second tape library in a forward and backward motion along an underlying rail system, wherein the non-maintenance position establishes a mechanical connection for transfer of the one or more tapes between the first tape library and the second tape library.

16. The computer system of claim 13, wherein program instructions to transfer the one or more tapes from the one or more tape library frames in the first tape library to one or more tape library frames in a second tape library, further comprises:
    program instructions to transfer the one or more tapes from a fixed passing tunnel portion of a passing tunnel module in the one or more tape library frames in the first tape library to a flexible passing tunnel module of a passing tunnel module in one or more tape library frames in the second tape library.

17. The computer system of claim 16, wherein program instructions to transfer the one or more tapes from a fixed passing tunnel portion of a passing tunnel module in the one or more tape library frames in the first tape library to a flexible passing tunnel module of a passing tunnel module in one or more tape library frames in the second tape library, further comprises:
    program instructions to move the one or more tapes through a mechanical transfer connection between the first tape library and the second tape library in a closed, non-maintenance position; and
    program instructions to activate a motor-driven side of each of a fixed passing tunnel portion of the passing tunnel module in the one or more tape library frames in the first tape library and a flexible passing tunnel portion of the passing tunnel module in the one or more tape library frames in the second tape library.

* * * * *